(12) United States Patent
McMahon et al.

(10) Patent No.: US 8,061,209 B1
(45) Date of Patent: Nov. 22, 2011

(54) PROCESS AND APPARATUS FOR SIZING A DAMPER RING

(75) Inventors: Ryan C. McMahon, North Palm Beach, FL (US); Kenneth I. Nelson, Stuart, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 647 days.

(21) Appl. No.: 12/212,011

(22) Filed: Sep. 17, 2008

(51) Int. Cl.
*G01M 7/06* (2006.01)

(52) U.S. Cl. .......................................... 73/663

(58) Field of Classification Search ............ 73/660, 73/662, 663, 672
See application file for complete search history.

(56) References Cited

U.S. PATENT DOCUMENTS

| | | | |
|---|---|---|---|
| 3,670,563 A * | 6/1972 | Light ............................... | 73/663 |
| 4,776,217 A | 10/1988 | Nolan | |
| 5,742,381 A | 4/1998 | Ueno | |
| 5,952,581 A | 9/1999 | Lammers et al. | |
| 5,969,251 A | 10/1999 | Tranquilla | |
| 6,014,899 A | 1/2000 | Uhlig et al. | |
| 6,085,593 A | 7/2000 | Pileri et al. | |
| 6,314,813 B1 | 11/2001 | Uhlig | |
| 6,341,258 B1 | 1/2002 | Inoue et al. | |
| 6,370,958 B1 | 4/2002 | Uhlig | |
| 6,382,027 B1 * | 5/2002 | Uhlig ............................... | 73/579 |
| 6,412,348 B1 | 7/2002 | Iemura et al. | |
| 6,742,381 B2 * | 6/2004 | Maeno ......................... | 73/11.01 |
| 2005/0201649 A1 * | 9/2005 | Davis et al. .................. | 384/523 |

* cited by examiner

*Primary Examiner* — Hezron E Williams
*Assistant Examiner* — Rose M Miller
(74) *Attorney, Agent, or Firm* — John Ryznic

(57) ABSTRACT

An apparatus and a process for determining the mass required for a wire damper ring to produce the maximum amount of damping in a certain rotary machine. The testing apparatus includes a test piece with an inward facing annular groove and a plurality of expander segments each with the top or outer half of a wire damper ring segment secured to and extending outward to fit within the annular groove. A mandrel with an outer surface having a slight slope is passed through a central opening of the expander segments and displaces the ring segments radially outward and into the annular groove at varying loads. The apparatus is set to vibrating and a piece of the test piece is observed for vibrations. The load applied to the damper ring segments is varied until the vibration is at a minimum. The applied load can now be correlated with the mass required for the damper ring to produce similar damping capability.

13 Claims, 5 Drawing Sheets

PROCESS AND APPARATUS FOR SIZING A DAMPER RING

FEDERAL RESEARCH STATEMENT

None

CROSS-REFERENCE TO RELATED APPLICATIONS

None.

BACKGROUND OF THE INVENTION

1. Field of the Invention

The present invention relates generally to vibration damping of a rotor machine, and more specifically to a process and an apparatus for determining a proper mass of a damper ring.

2. Description of the Related Art including information disclosed under 37 CFR 1.97 and 1.98

A rotary machine, such as a small gas turbine engine, may develop rotary dynamic problems due to rotor shaft imbalance that will produce excessive vibration above a certain rotation speed. For this reason, damper rings are used to provide a damper for the rotor to reduce the vibration level to that which will be acceptable and not damage to the rotary machine occurring.

Damper rings produce a damping affect due to the mass of the ring rubbing against the rotating groove in which the ring rides. Computer modeling of damper rings can be done, but the results are not accurate enough. To properly size a damper ring, one would manufacture the damper ring at different masses and then test each damper ring in the rotary machine until one finds that the vibrations are minimal. However, this requires a lot of time and machining to produce the different sizes of damper rings.

BRIEF SUMMARY OF THE INVENTION

It is an object of the present invention to provide for an apparatus that can be used to determine the right mass of a damper ring to produce the most effective damping for a given rotary machine.

It is another object of the present invention to simulate the vibration dampening capability of a damper ring under varying mass.

It is another object of the present invention to provide for a rotary machine with a high level of vibration dampening.

The present invention is a process and an apparatus for determining a proper mass required for a damper ring to produce the best damping capability for a given rotary machine. The apparatus simulates the dampening capability of a damper ring by vibrating the apparatus with a shaker table and observing the vibrations of parts such as rotor blades extending outward from the apparatus. A damper ring is simulated by reproducing the outer surface of the damper ring on a segmented annular piece that, when assembled into a complete annular segmented assembly, fits within an inward facing groove formed within a housing to simulate the damper ring groove. A mandrel is threaded through a central hole in the segmented mandrel assembly to force the simulated damper ring segments into the annular groove and represent loading. The entire assembly is then vibrated by a shaker table to produce vibration. The radial loading applied to the simulated damper ring is varied to reproduce various masses and the amount of vibration damping produced is determined by observing the amount of vibration the outward extending blades undergo. By changing the radial loading occurring on the damper ring segments, the amount of damping can be determined based upon the simulated mass of the damper ring. The mass required for a certain damper ring is determined by varying the radial loading applied to the damper ring segments until the best vibration damping occurs as determined by observing the vibrating parts extending outward from the assembly.

The process for determining the proper mass for a damper ring includes the steps of reproducing the shape of the damper ring outer half on a plurality of segmented members that are capable as a unit assembly of expanding radial outward, mounting the damper ring segments within an inwardly facing groove formed within a housing of the assembly, vibrating the assembly in order to cause blades extending outward from the assembly to vibrate, vary the amount of force the damper ring segments abut against the annular groove until the blades show the least amount of vibrating, and then determining the amount of mass a damper will require based upon the amount of force the damper ring segments are under that causes the least amount of vibrating.

DETAILED DESCRIPTION OF THE INVENTION

Figure 1:
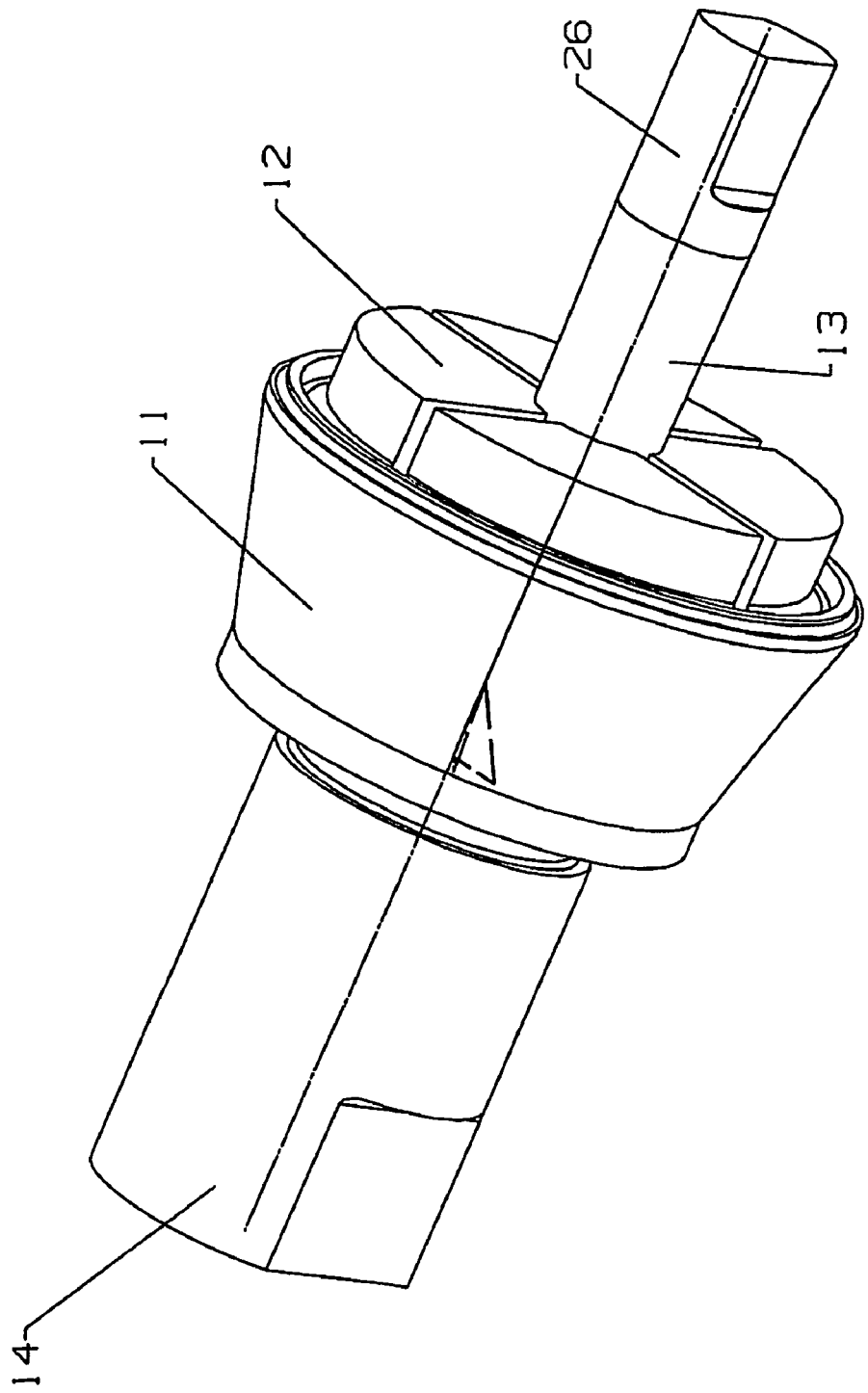
FIG. 1 shows a perspective view of the assembly apparatus of the present invention for determining the mass of a damper ring required for produce maximum damping capability.
Figure 2:
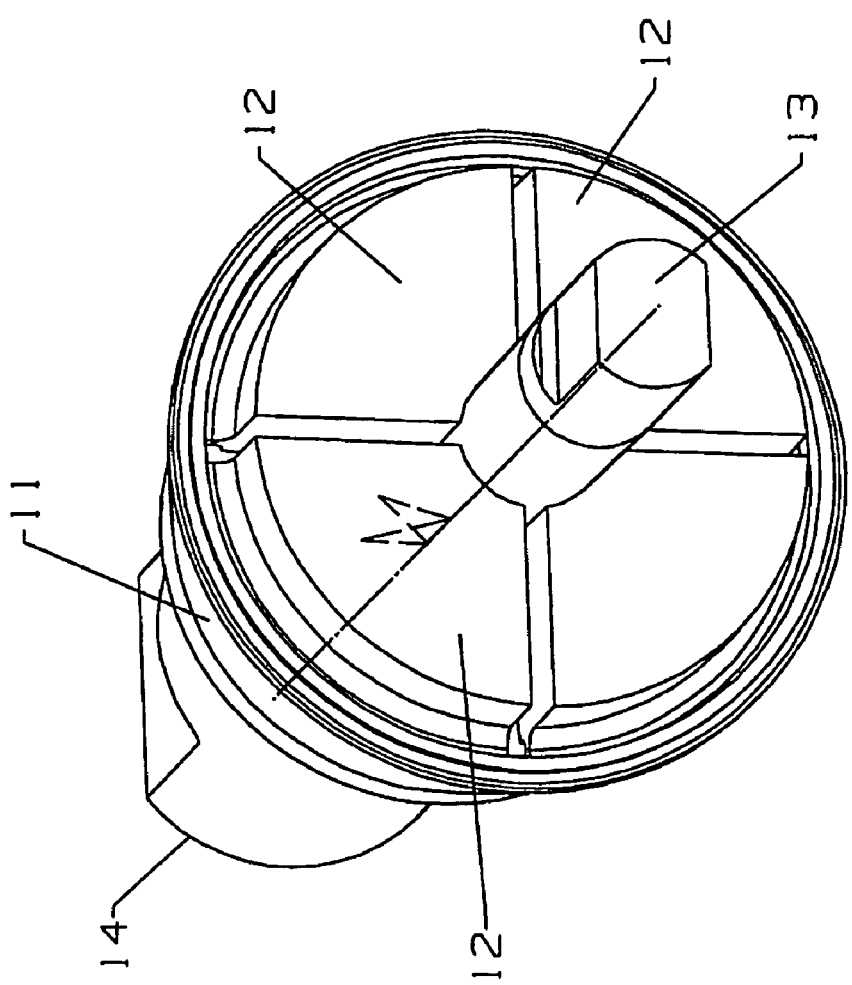
FIG. 2 shows a rear perspective view of the assembly apparatus of FIG. 1.
Figure 3:
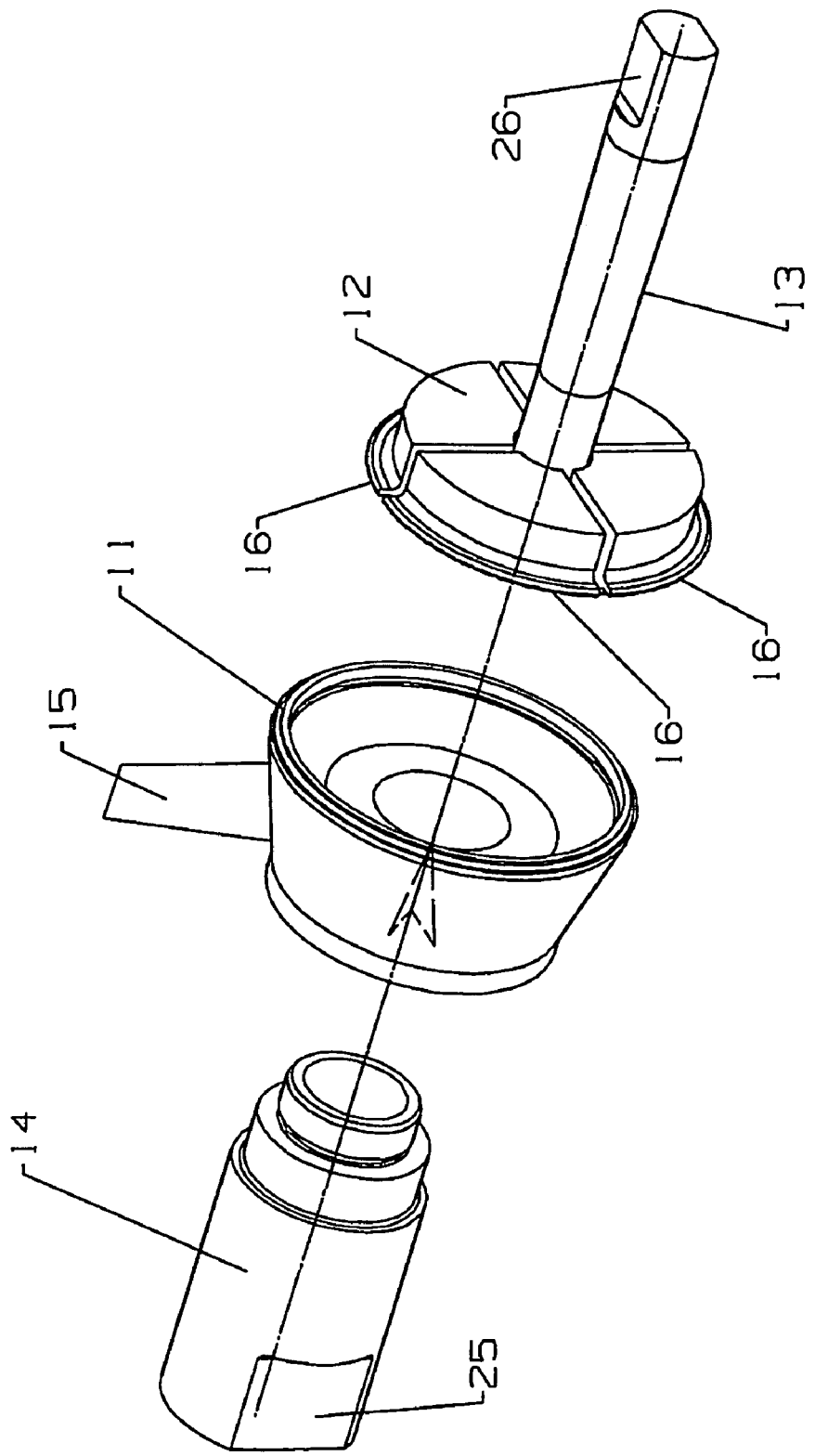
FIG. 3 shows a perspective view of assembly of the present invention disassembled.
Figure 4:
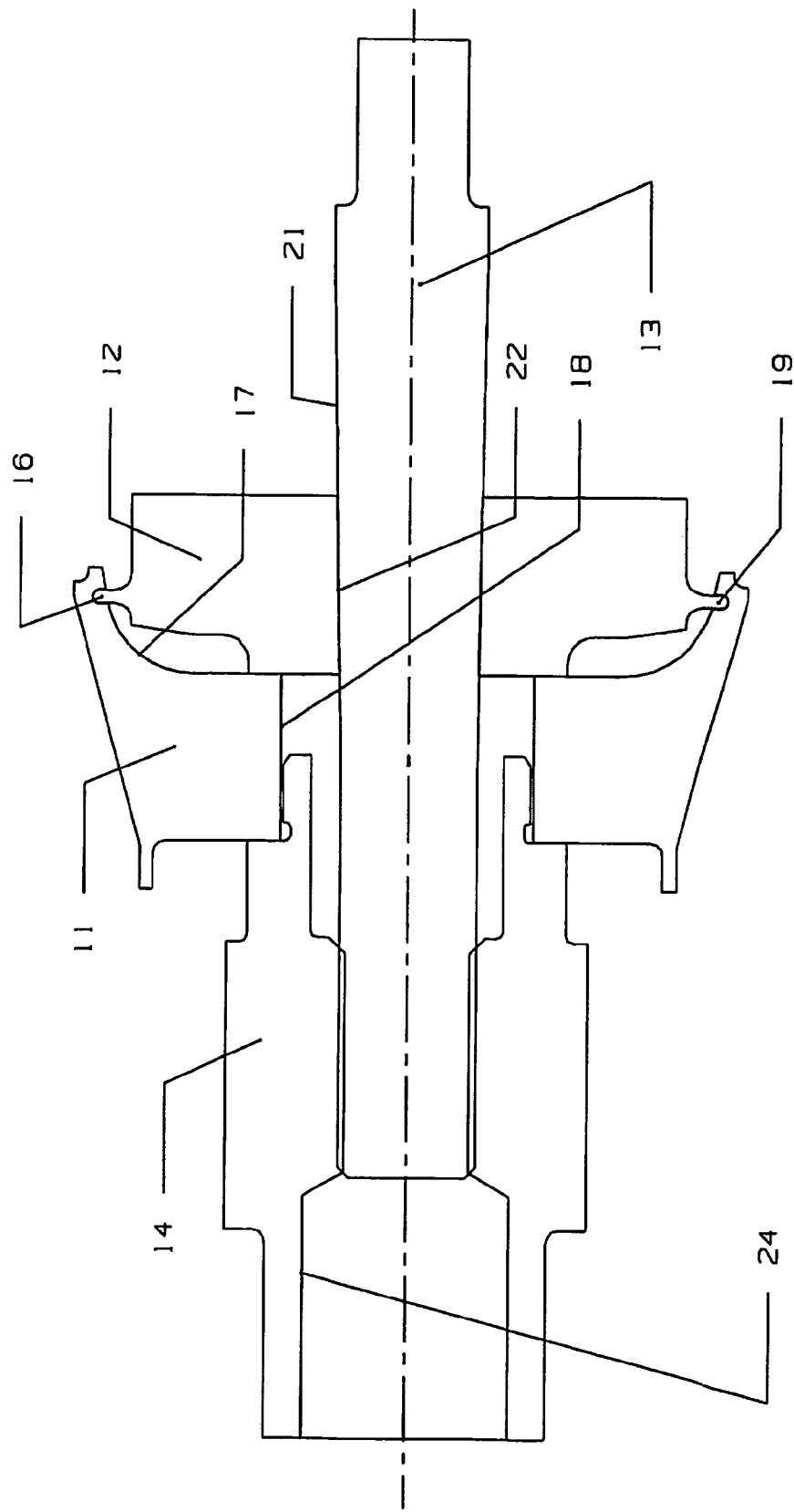
FIG. 4 shows a cross section view of the assembly apparatus of the present invention.

The damper ring testing apparatus of the present invention is shown in FIGS. 1-4 with the assembled device shown in FIG. 1 and the disassembled device shown in FIG. 3. The assembly includes a test article 11, or in this case an integrally bladed rotor (IBR) with a plurality of rotor blades (one shown as 15 in FIG. 3) extending radial outward from the rotor disk. The rotor disk or test article 11 includes a smaller diameter central opening 18 on the forward (left) side and a larger diameter central opening 17 on the aft side as seen in FIG. 4. The inner surface of the larger diameter central opening 17 includes an annular groove 19 facing inward and on the end of the larger diameter central opening 17. The annular groove 19 is sized to fit a wire damper ring that is to be tested.

A number of segmented expanders 12 (also referred to as an expander segment) forms an annular expander assembly and has a central opening 22 extending through the assembly which is slightly tapered with a smaller diameter on the forward (left) side than on the aft (right) side as seen in FIG. 4. Formed as part of each segmented expander 12 is a damper ring extension 16 that duplicates the outer half shape of the damper ring to be tested. The damper ring extension 16 of the segmented expander 12 is sized to fit within the annular groove 19 formed within the IBR or test article 11. In the present embodiment, the segmented expander 12 is formed from four similar shaped segments. However, more or less segments can be used as long as the function of the expander assembly is performed as to be described below. FIG. 2 shows the expander segments 12 from the aft end in which slots are formed between adjacent expander segments 12 in order to allow for installation of the last piece within the test article 11. There are 4 blades extending from the test article or rotor 11 for each expander segment 12. The expander segments 12 are stiff to provide a steep load curve and are made from alloy steel. A softer material may be required or very shallow slope on the mandrel. In the present invention, the damper rings are formed into the expander segments. In another embodiment, a damper ring segment 16 can be secured to the expander segments 12 by brazing or some other means to secure the ring segment 16 to the expander segment 12 so that the two pieces will function as a single piece during the vibration and testing phase of the invention.

A base or support housing 14 is threaded into the smaller central opening 18 of the IBR 11 and abuts against the side face as seen in FIG. 4. The base 14 includes a central opening 24 that is also threaded to allow for the mandrel 13—which also has threads on the forward (left) end—so that the mandrel 13 can be axial positioned within the base 14 by rotating the mandrel 13 with respect to the base 14. The base 14 is to be secured to a shaker table (not shown) for testing the damper ring. The base 14 also includes two opposed wrenching flats 25 for a wrench to turn the base into the IBR 11.

The mandrel 13 includes a forward end with threads that screw into the threads of the base 14, an aft end with wrench flats 26, and a slightly tapered conical surface between the ends having the same slope and diameters as the central opening 22 in the segmented expander assembly 12. The purpose of the conical shaped sloping surfaces on the mandrel 13 and the expander segments 12 is to displace the damper ring segments 16 in a radial direction when the mandrel 13 is moved axially with respect to the expander segments 12. Displacing the damper ring segments 16—which reproduce the damper ring to be tested—in the radial direction compresses the ring segments 16 against the inner surface of the annular groove 19 formed within the IBR 11 to represent mass of the damper ring during rotational operation of the IBR 11. The load applied to the damper ring segments 16 can be varied by displacement of the expander segments 12 with respect to the IBR or test article 11. The Mandrel 13 includes 5/16-32 UNEF thread and slope to provide 0.005 inch radial movement per complete turn.

Thus, the damper ring testing apparatus of the present invention simulates a damper ring by forming the ring segments 16 on the expander segments 12, inserting the ring segments 16 into the inward facing annular groove 19 formed in the test article or IBR 11, and displacing the mandrel 13 through the central opening formed within the expander segments 12 to force the ring segments 16 into the annular groove 19 to apply a load to the damper ring and simulate the mass of the damper ring pushing up against the annular groove 19 due to centrifugal forces resulting from rotation.

The assembled device with the rotor blades 15 extending out from the test article 11 is secured to a shaker table and then set to vibrating. When the assembly is vibrating due to the shaker table, the rotor blades 15 will also start to vibrate. The vibration of the blades 15 is observed by any known device such as Holography that can detect the amount of vibration on the blades 15 occurring. During the vibration of the blades 15, the mandrel 13 is moved axially to change the radial displacement of the ring segments 16 within the annular groove 19 to change the load applied to the damper ring. The loading is changed until the least amount of vibration in the blades 15 is observed or determined. The least amount of vibration occurring in the blades 15 occurs when damper ring segments 16 are forced against the annular groove 19 at a load that can be correlated to the amount of mass that the real damper ring would be required to have if operated at the known rotational speed in the IBR to produce the maximum damping. Thus, the apparatus and process for testing the damper rings allows for the correct mass to be determined that will produce the highest level of damping in the particular rotor used in the testing.

Figure 5:
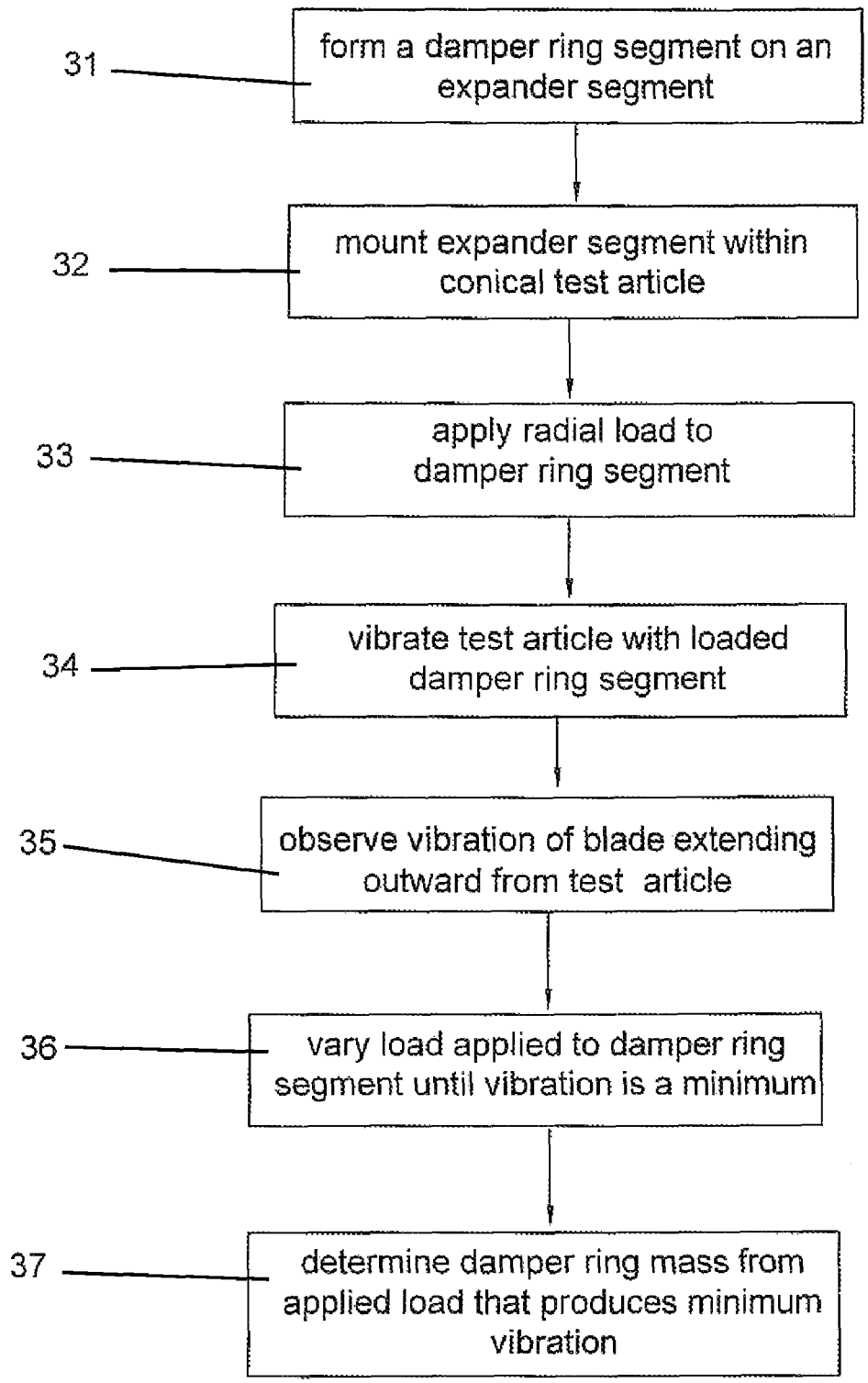
FIG. 5 shows a flow chart with the various steps of the process for determining the mass of a damper ring that produces the most effective damping.

The process for determining the proper mass for a damper ring that will produce a maximum amount of damping with a minimum amount of vibration is shown in the flowchart of FIG. 5. The process includes the steps of forming the damper ring segments 16 onto the outer surface of the expander segments 12 (step 31), mounting the expander segments 12 into the inner conical surface of the test article 11 (step 32) so that the damper ring segments 12 are pushed up against the inner surface, applying a radial load to the damper ring segments 12 (step 33) by displacing the Mandrel 13 axial with respect to the expander segments 12 to force the damper ring segments 16 against the test article 11 surface to vary the load, set the test article 11 and the damper ring segments 12 to vibration (step 34) using the shaker table, observing the vibration of the blade 15 extending outward from the test article 11 (step 35), varying the radial load applied to the damper ring segments 16 (step 36) by axially displacing the Mandrel 13 until the vibration of the blade 15 is at a minimum, and determining what the load applied to the damper ring segment 16 is (step 37) that produces the minimum vibration for the maximum damping capability of the damper ring.

The present invention described above is intended to be used for determining the mass required for a wire damper ring used in a rotor disk (IBR) of a small gas turbine engine with very high rotational speeds. However, the present invention can also be used for larger engines or other type of rotors such as compressors or turbo-pumps. The invention can be used for testing wire damper rings used in other forms such as rotating shafts.

We claim the following:

1. A wire damper ring testing apparatus comprising:
a test article having a central opening with an annular groove facing inward;
a base supported on one end of the test article;
an expander segment having a central opening passing through with a slight taper, the expander segment having a top half of a wire damper ring segment to be tested secured to an outer radial surface of the expander segment;
the wire damper ring segment fitted into the annular groove of the test article piece; and,
a mandrel having one end engaging with the base and a slightly tapered outer surface to engage the tapered central opening of the expander segment to produce a radial displacement of the wire damper ring segment due to an axial displacement of the mandrel.

2. The wire damper ring testing apparatus of claim 1, and further comprising:
a plurality of expander segments each with a wire damper ring segment extending outward, the plurality of expander segments forming an annular expander segmented assembly.

3. The wire damper ring testing apparatus of claim 2, and further comprising:
a slot formed between adjacent expander segments sized to allow for the expander segments to be installed within the test article.

4. The wire damper ring testing apparatus of claim 1, and further comprising:
the wire damper ring segment and the expander segment are formed as a single piece.

5. The wire damper ring testing apparatus of claim 1, and further comprising:

the wire damper ring segment and the expander segment are formed as two pieces bonded together to form one integral piece.

6. The wire damper ring testing apparatus of claim 1, and further comprising:

the mandrel is threaded into a central opening of the base such that rotation of the mandrel produces the radial displacement of the damper ring segment.

7. The wire damper ring testing apparatus of claim 1, and further comprising:

the test article is an integrally bladed rotor with rotor blades extending outward.

8. The wire damper ring testing apparatus of claim 1, and further comprising:

the base screws into the central opening of the test article.

9. The wire damper ring testing apparatus of claim 6, and further comprising:

the threads on the base and the mandrel and the slope of the surfaces on the mandrel and the central opening of the expander segment are of such size that one rotation of the mandrel produces a radial deflection of the wire damper ring segment of 0.001 inch.

10. The wire damper ring testing apparatus of claim 1, and further comprising:

the annular groove and the wire damper ring segment are of the same size.

11. A process for determining a mass for a wire damper ring used to dampen vibrations in a rotating part, the process comprising:

forming a test article with an inward facing annular groove having a size to fit the wire damper ring;

fitting a damper ring segment within the annular groove of the test article;

vibrating the test article with the damper ring segment loaded against the annular groove;

displacing the damper ring segment in a radial direction to change the load applied;

observing the amount of vibration occurring on the test article;

varying the load applied to the damper ring segment until the observed vibration is near a minimum; and, determining the required mass for the wire damper ring based upon the applied load that produces the near minimum vibration.

12. The process for determining the mass for the wire damper ring of claim 11, and further comprising the steps of:

forming an annular array of expander segments each with a damper ring segment extending outward.

13. The process for determining the mass for the wire damper ring of claim 11, and further comprising the steps of:

securing the test article and the expander segment to a shaker table to produce the vibration.

* * * * *